US010339211B1

(12) United States Patent
Patterson et al.

(10) Patent No.: US 10,339,211 B1
(45) Date of Patent: Jul. 2, 2019

(54) SYSTEMS AND METHODS FOR SYNCHRONIZING COMMENTS TO AN ELECTRONIC DOCUMENT ACROSS PLATFORMS

(71) Applicant: Google Inc., Mountain View, CA (US)

(72) Inventors: John Patterson, Manly (AU); Cayden Meyer, Pyrmont (AU); David Armstrong, Hornsby (AU); David Lattimore, Pyrmont (AU); Lior Biran, Baulkham Hills (AU)

(73) Assignee: Google LLC, Mountain View, CA (US)

( * ) Notice: Subject to any disclaimer, the term of this patent is extended or adjusted under 35 U.S.C. 154(b) by 410 days.

(21) Appl. No.: 15/168,402

(22) Filed: May 31, 2016

(51) Int. Cl.
*G06F 17/00* (2019.01)
*G06F 17/24* (2006.01)
*G06F 3/0484* (2013.01)
*H04L 29/08* (2006.01)
*G06F 16/93* (2019.01)

(52) U.S. Cl.
CPC .......... *G06F 17/241* (2013.01); *G06F 3/0484* (2013.01); *G06F 16/93* (2019.01); *H04L 67/1097* (2013.01)

(58) Field of Classification Search
CPC .................................................. G06F 17/241
See application file for complete search history.

(56) References Cited

U.S. PATENT DOCUMENTS 6,061,747 A * 5/2000 Ducaroir ................. G09G 5/006
710/21
9,064,237 B2 * 6/2015 Simons ............... G06F 17/2247
9,245,014 B2 * 1/2016 Kozak ................. G06F 17/3071
9,613,046 B1 * 4/2017 Xu ......................... G06F 16/178
9,812,169 B2 * 11/2017 O'Brien ................ G11B 27/034
9,832,195 B2 * 11/2017 Gillett ...................... H04L 51/04
2007/0220143 A1 * 9/2007 Lund ......................... H04L 51/04
709/224
2009/0106312 A1 * 4/2009 Breslau ............... G06F 3/04895

(Continued)

OTHER PUBLICATIONS

International Searching Authority, "Notification of Transmittal of the International Search Report and the Written Opinion of the International Search Authority, or the Declaration," for International Application No. PCT/US2017/035295, dated Aug. 30, 2017, 12 pages.

*Primary Examiner* — Laurie A Ries
(74) *Attorney, Agent, or Firm* — Lowenstein Sandler LLP (57) ABSTRACT

Systems and methods disclosed herein provide a mechanism for synchronizing comments to an electronic document across platforms. In some embodiments, a cloud storage server may receive an electronic document uploaded from a user device, and save the electronic document in its native format at the server without converting the document to a different format. When the user device attempts to access the document remotely, the cloud storage server may present the document in its native format to the user device so that a user may edit the document in the native format without downloading the document to the local drive. For example, the user can add a comment in a structure that is specific to the native application format without locally installing the native application on the user device. The cloud storage server may in turn incorporate the comment into the document for display in real time.

20 Claims, 7 Drawing Sheets

(56) References Cited

U.S. PATENT DOCUMENTS

| | | | |
|---|---|---|---|
| 2010/0095198 A1* | 4/2010 | Bultrowicz | G06F 17/241 |
| | | | 715/234 |
| 2012/0054594 A1* | 3/2012 | Isaacson | H04L 12/1827 |
| | | | 715/230 |
| 2013/0191720 A1* | 7/2013 | Simons | G06F 17/30882 |
| | | | 715/234 |
| 2013/0318125 A1* | 11/2013 | Smith | H04L 63/08 |
| | | | 707/781 |
| 2014/0032633 A1 | 1/2014 | Kleppner | |
| 2014/0122991 A1 | 5/2014 | Achillopoulos | |
| 2014/0325362 A1* | 10/2014 | Potts | G06F 17/211 |
| | | | 715/732 |
| 2015/0082148 A1* | 3/2015 | Lai | G06F 17/214 |
| | | | 715/235 |
| 2015/0112927 A1 | 4/2015 | Lee et al. | |
| 2015/0135097 A1* | 5/2015 | Carriero | G06F 9/54 |
| | | | 715/753 |
| 2015/0163206 A1* | 6/2015 | McCarthy | G06F 21/6227 |
| | | | 713/171 |
| 2016/0050177 A1* | 2/2016 | Cue | G06F 16/273 |
| | | | 709/206 |
| 2016/0092442 A1* | 3/2016 | Gillett | G06F 17/30011 |
| | | | 707/608 |
| 2016/0092791 A1* | 3/2016 | Moghaddam | G06N 99/005 |
| | | | 706/12 |
| 2016/0117289 A1* | 4/2016 | Pan | G06F 17/211 |
| | | | 715/230 |
| 2017/0041296 A1* | 2/2017 | Ford | H04L 63/0421 |
| 2017/0052969 A1* | 2/2017 | Carriero | G06F 17/3089 |
| 2017/0289210 A1* | 10/2017 | Pai | H04L 65/403 |

\* cited by examiner

SYSTEMS AND METHODS FOR SYNCHRONIZING COMMENTS TO AN ELECTRONIC DOCUMENT ACROSS PLATFORMS

FIELD OF THE INVENTION

In general, this disclosure relates to collaborative document management in a cloud environment, in particular, to systems and methods for synchronizing comments to an electronic document across platforms.

BACKGROUND

In a collaborative document editing system, a user can often upload an electronic document to a remote server, and keep a local copy of the electronic document on the local drive of the user device. A large number of such electronic documents can be word documents and PDFs. Comments on these files today can only be made within the native editor such as a dedicated editing application that can open and modify a word or a PDF document. In order to make a comment within the document, such as adding a comment section in a word or PDF document, the user usually needs to download the most up-to-date copy of the document from the remote server to the local drive, and then open the downloaded copy via a locally installed application such as a word processor to insert a comment. After inserting the comment, the user usually uploads the updated document including the newly added comment back to the remote server such that the server and the local user device are synchronized with edited content. Thus at least two rounds of manual operations including downloading and uploading are performed by a user in order to add a comment in a document in the cloud.

When receiving a document from a user device, the remote server usually converts the document from its native format to a format compatible with the remote storage system. When a user needs to download or export the document to their local drive to make a comment, the remote server may then again convert the document back to its native format for the comment to be made. Thus at least two rounds of format conversion are usually involved at the remote server.

SUMMARY

Systems and methods disclosed herein provide a mechanism for synchronizing comments to an electronic document across platforms. In some embodiments, a remote server may receive an electronic document uploaded from a user device, and may save the electronic document in its native format at the server without converting the document to a different format. The remote server may receive, from a user device, a request to access the electronic document, and may in turn present, via a remote document access user interface at the user device, the electronic document to the user device without the user device downloading a copy of the electronic document. The remote server may receive, via the remote document access user interface at the user device without a dedicated document processing application locally installed, a document comment in a previously determined structure associated with the native document format. The remote server may then incorporate, at the remote server, the document comment into the electronic document, and present, via the remote document access user interface, the electronic document having the document comment included in the previously determined structure in real time.

BRIEF DESCRIPTION OF THE DRAWINGS

The above and other features of the present disclosure, including its nature and its various advantages, will be more apparent upon consideration of the following detailed description, taken in conjunction with the accompanying drawings in which.

DETAILED DESCRIPTION

To provide an overall understanding of the systems and methods described herein, certain embodiments will now be described, including a system and method for synchronizing comments to an electronic document across platforms. However, it will be understood by one of ordinary skill in the art that the systems and methods described herein may be adapted and modified as is appropriate for the application being addressed and that the systems and methods described herein may be employed in other suitable applications, and that such other additions and modifications will not depart from the scope thereof. Generally, the computerized systems described herein may comprise one or more engines, which include a processing device or devices, such as a computer, microprocessor, logic device or other device or processor that is configured with hardware, firmware, and software to carry out one or more of the computerized methods described herein.

In one embodiment, a mechanism for synchronizing comments to an electronic document across platforms such as a remote server and a user device is discussed herein. A cloud storage server may import, export and keep in synchronization comments from electronic documents with a real-time commenting system. This real-time commenting system may reduce the complexity of syncing files across multiple devices and file collisions. In some implementations, when comments are made on the document via a web or mobile interface or via the application programming interface (API), the comments are batched over time and then the original document bytes are updated to reflect the comments made via the real time commenting system. The updated document bytes are then synchronized to devices that are listening for changes to that document. When more comments are made, the previous version of the document having old comments may be deleted and replaced with the updated version.

Comments and replies to the comments may be merged by timestamps. For example, when a document, such as a word or PDF document is uploaded to a cloud storage server (such as a private or a public cloud), the document is saved in its native format, instead of being converted to a different format to be stored at the cloud storage server. In this way, when the user device attempts to access the document remotely, the cloud storage server may present the document in its native format to the user device so that a user may edit the document in the native format without downloading it.

For example, a user can add a comment to the document, which usually is done as a feature specific to the native format. The cloud storage server may then directly incorporate the comment into the electronic document in real time. In this way, if the user device, or another user device accesses the document, the document having the comment incorporated may be displayed.

In some implementations, the comment that has been added to the document saved in the cloud storage server may be automatically synchronized with a local copy at the user device, e.g., if the user device originally uploaded the document to the cloud. In this way, the user no longer needs to re-enter the comment to the local copy of the document, and thus document editing efficiency has been improved.

Figure 1:
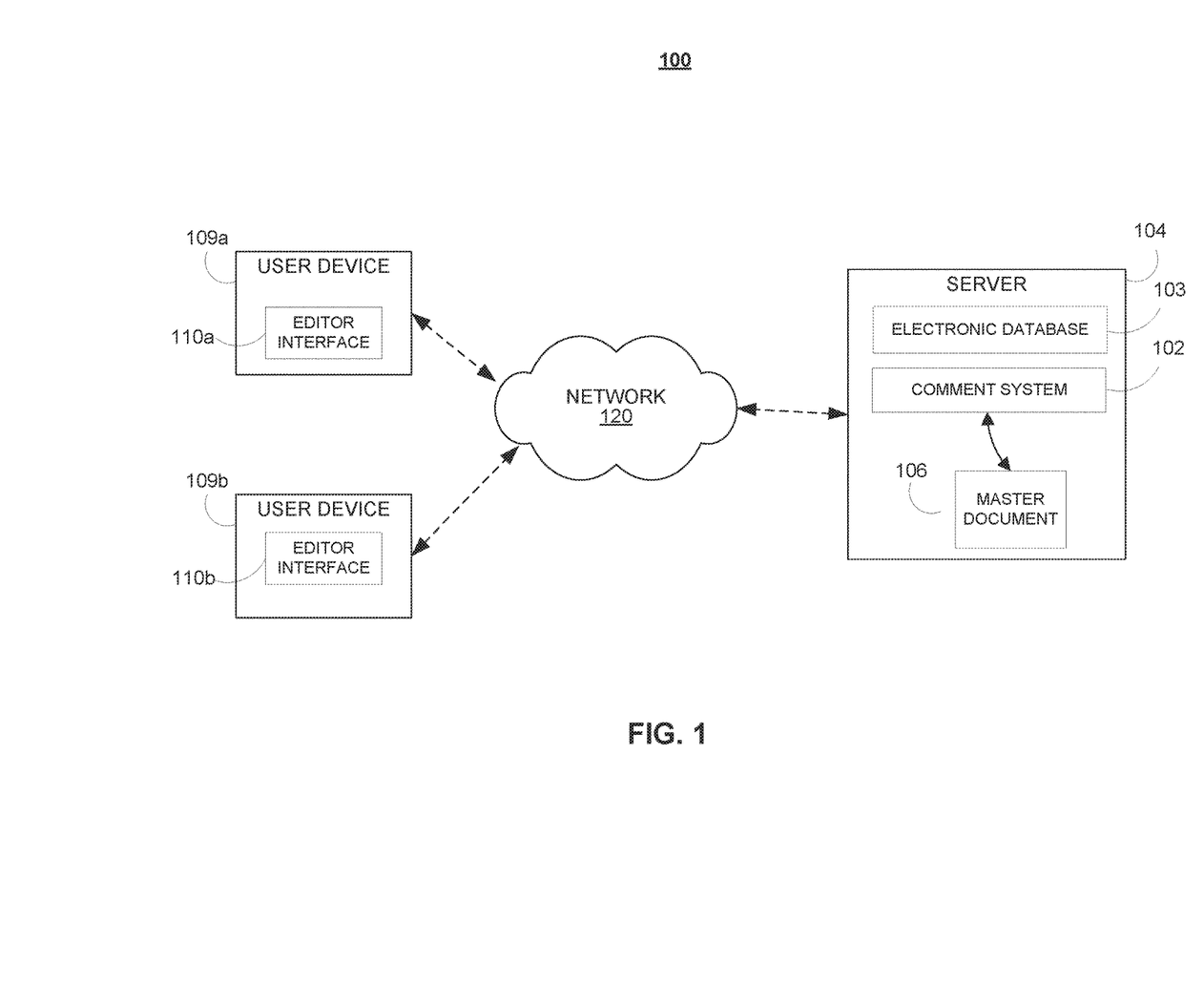
FIG. 1 is a diagram of a computerized system 100 for providing a collaborative document environment, according to an illustrative embodiment.

FIG. 1 is a diagram of a computerized system 100 for providing a collaborative document environment, according to an illustrative embodiment. System 100 includes a server 104 and multiple user devices 109a-b connected over a network 120. The server 104 includes an electronic database 103 and a comment system 102, which manages updates to various versions of a master document 106. The master document 106 may be stored on the electronic database 103 on the server 104, or in a separate storage device.

To make the process of collaborating on electronic documents more efficient, a collaborative document editing environment is provided for integrating collaboratively proposed changes of an electronic document. In the collaborative document editing environment, users at different user devices 109a-b may simultaneously access the master document 106 to review the document and propose changes. As is shown in FIG. 1, each user may interact with the master document 106 over the editor interface 110a-b. The editor interface 110a-b may include a mobile application (e.g., for a mobile device, etc.), or a browser based application, and/or the like. In this way, the user device does not need to locally install a dedicated word processor or viewing application in order to access and open the master document 106.

Applications may want to allow a user to add a comment to the document. The comment may be placed in a comment structure within the document such as a dialog box, a footnote, a callout, and/or the like. Such comment structure may be added with a specific word processor with the document opened in its native format respective to the specific word processor. For example, a dedicated editing application that can open and modify a word or a PDF document may have a commenting mechanism to allow a user to add a comment to a word or PDF document, which can include a previously determined structure to be displayed within the document, such as but not limited to a dialog box, a callout window, a footnote, and/or the like. In this case, the master document 106 may be saved in its native format such that the user device can access the master document via the editor interface 110a-b in the native format.

Figure 2:
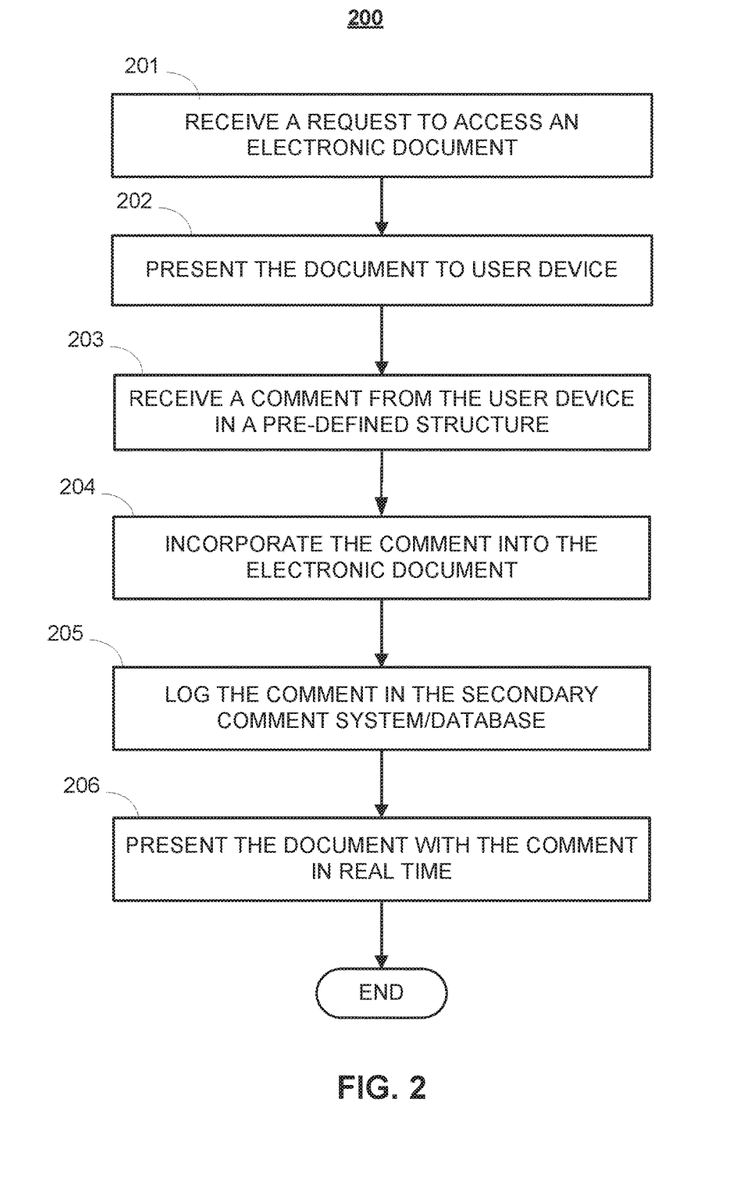
FIG. 2 is an example logic flow diagram illustrating aspects of server-side work flows of real time comment incorporation, according to an illustrative embodiment.

FIG. 2 is an example logic flow diagram 200 illustrating aspects of server-side work flows of real time comment incorporation, according to an illustrative embodiment. At 201, the remote server (e.g., see 104 in FIG. 1) may receive a request to access an electronic document from a user device. The remote server may then present the document to the user device at 202, e.g., via the editor interface 110a-b in FIG. 1. The document may be presented via a mobile application or a browser-based application window, but in its native format such as a word or PDF document. At 203, the remote server may receive a comment from the user device, which is formatted in a pre-defined structure, e.g., the word document comment box or a PDF comment box, etc. At 204, the remote server may incorporate the comment into the electronic document, and log the comment in a secondary comment database at 205. In this way, the remote server can present the electronic document via the editor interface with the comment in real time at 206, e.g., the user does not need to download a copy of the document to the user device, add the comment and then upload the document back to the remote server.

Figure 3:
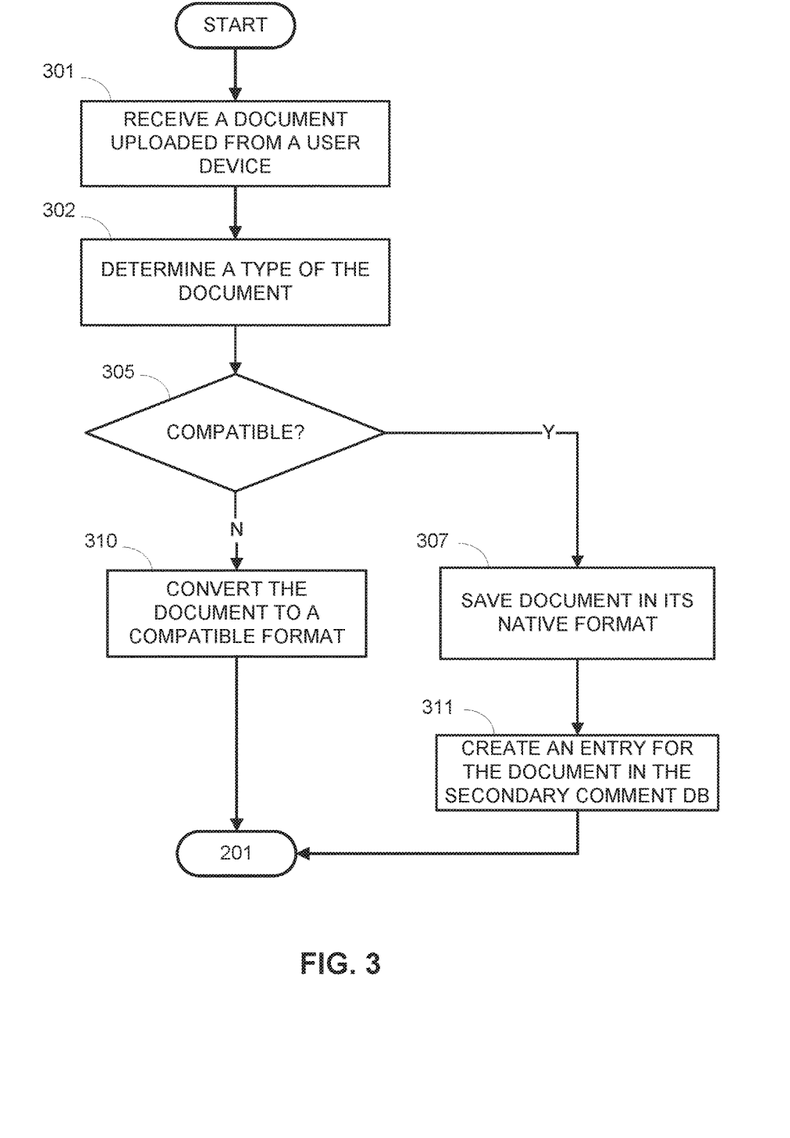
FIG. 3 is an example logic flow diagram illustrating aspects of server-side work flows of storing an uploaded electronic document, according to an illustrative embodiment.

FIG. 3 is an example logic flow diagram 300 illustrating aspects of server-side work flows of storing an uploaded electronic document, according to an illustrative embodiment. At 301, the remote server may receive a document uploaded from a user device. At 302, the remote server may determine a type of the document. For example, if the document format is of a compatible format with the remote server, e.g., a recognizable document format such as but not limited to a word or PDF document, at 305, the remote server may save the document in its native format at 307. Otherwise, if it is incompatible with, or unrecognizable by applications available to the remove server, the remote server may convert the document to a compatible format at 310. At 311, the remote server may create an entry in the comment database for the document to save any comments the document may have, and then proceed to 201 in FIG. 2.

Figure 4:
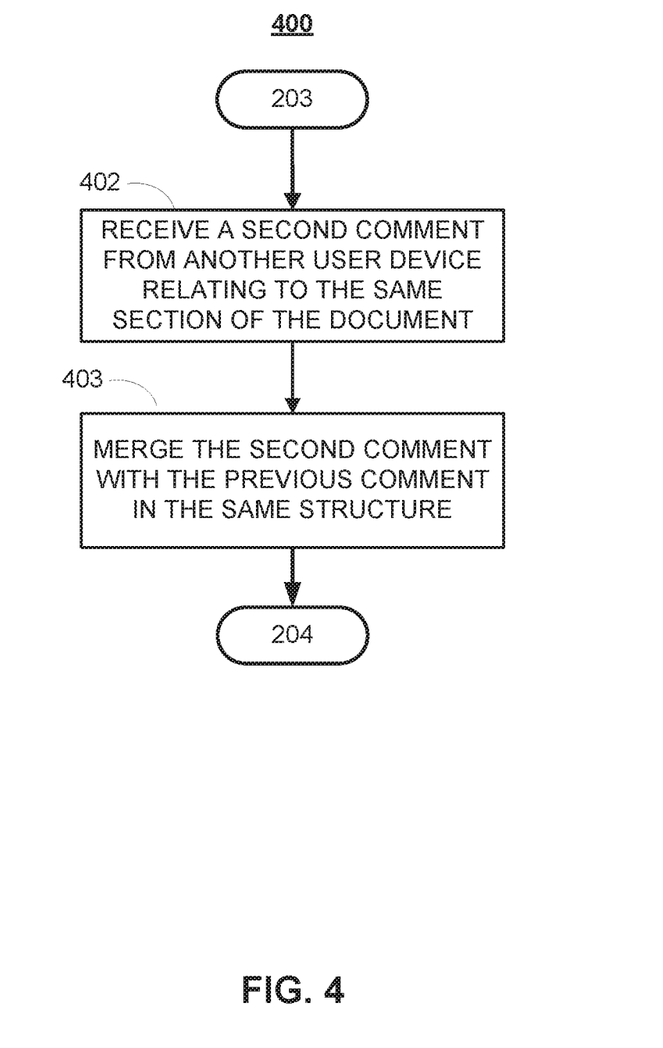
FIG. 4 is an example logic flow diagram illustrating aspects of server-side work flows of merging comments, according to an illustrative embodiment.

FIG. 4 is an example logic flow diagram 400 illustrating aspects of server-side work flows of merging comments, according to an illustrative embodiment. Starting from 203 in FIG. 2, at 402, the remote server may receive a second comment from a different user device relating to the same section of the document as the comment received at 203. The two comments can thus be merged in the same comment structure, e.g., the same footnote, comment box, callout box, etc., at 403, and the remote server may proceed to 204. In some implementations, comments from different user devices may be merged based on the content (e.g., when the two comments share similar words, phrases, etc.), related section of the document (e.g., when the two comments are related to the same sentence/paragraph or other portions of the document), and/or the like. In some implementations, the two comments from different user devices may be presented in different comment structures (e.g., different callout boxes, etc.) with different colors to illustrate that the comments are made by different users. In some implementations, a user may configure display parameters for the comments, e.g., comments added at different times may be displayed in different colors, with a timestamp, and/or the like.

Figure 5:
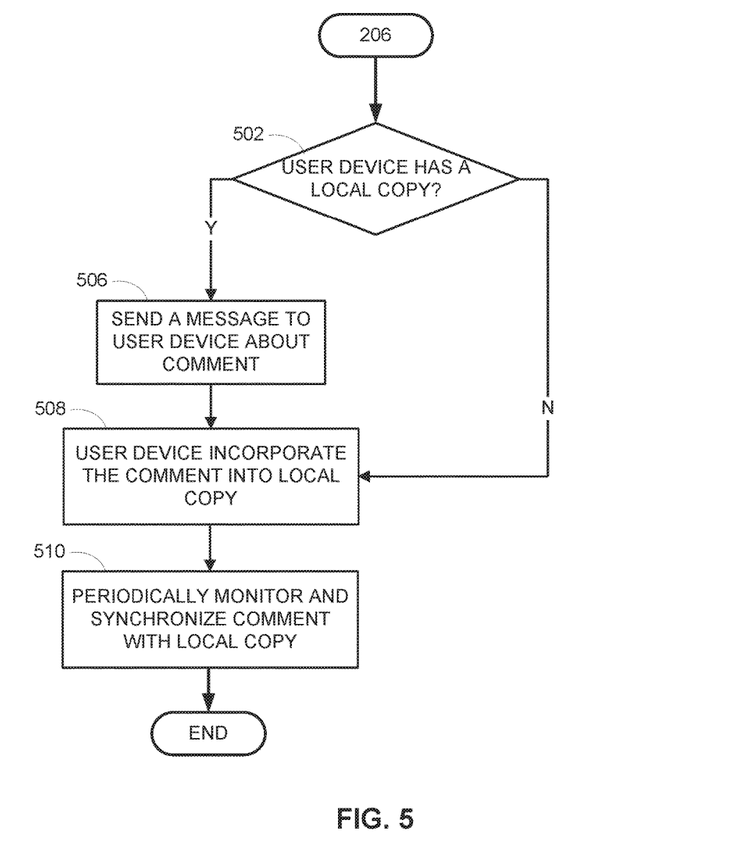
FIG. 5 is an example logic flow diagram illustrating aspects of server work flows of real time synchronization of comments between the remote server and a user device, according to an illustrative embodiment.

FIG. 5 is an example logic flow diagram 500 illustrating aspects of server work flows of real time synchronization of comments between the remote server and a user device, according to an illustrative embodiment. Starting from 206 in FIG. 2, the remote server may determine whether the user device has a local copy of the document at 502. The remote server may send a message to a user device including information of the comment at 506, such that the user device may automatically incorporate the comment into the local copy of the document to synchronize with the document on the remote server at 508. In some implementations, the remote server may periodically monitor and synchronize comments with the local copy at 510. For example, each comment may be associated with a timestamp, and the remote server may send updated comments based on the timestamp of each comment and the last synchronization time.

Figure 6:
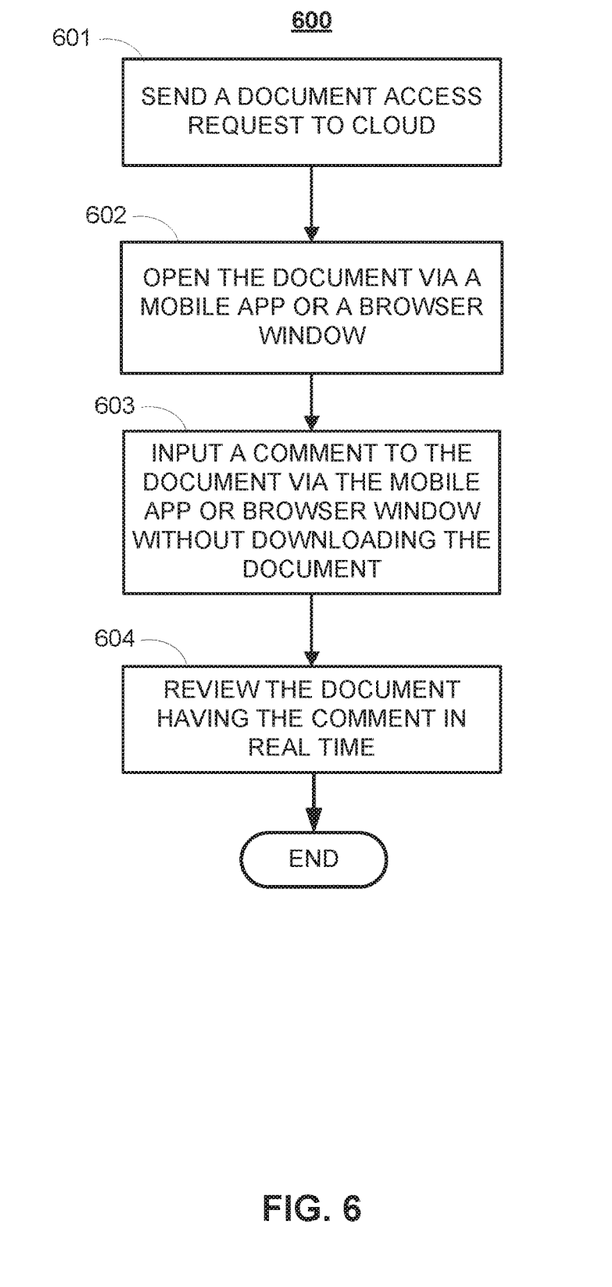
FIG. 6 is an example logic flow diagram illustrating aspects of user-side work flows of real time comment incorporation, according to an illustrative embodiment.

FIG. 6 is an example logic flow diagram 600 illustrating aspects of user-side work flows of real time comment incorporation, according to an illustrative embodiment. A user device may send a document access request to a cloud storage system, e.g., the remote server at 601. The user device may then open and access the document via a mobile application or a browser window instantiated at the device, at 602. At 603, the user device may receive a comment from a user, and then input the comment to the document via the mobile application or the browser window interface, without downloading the document to the user device. At 604, the user may review the document having the incorporated comment in real time via the mobile application or the browser window interface.

Figure 7:
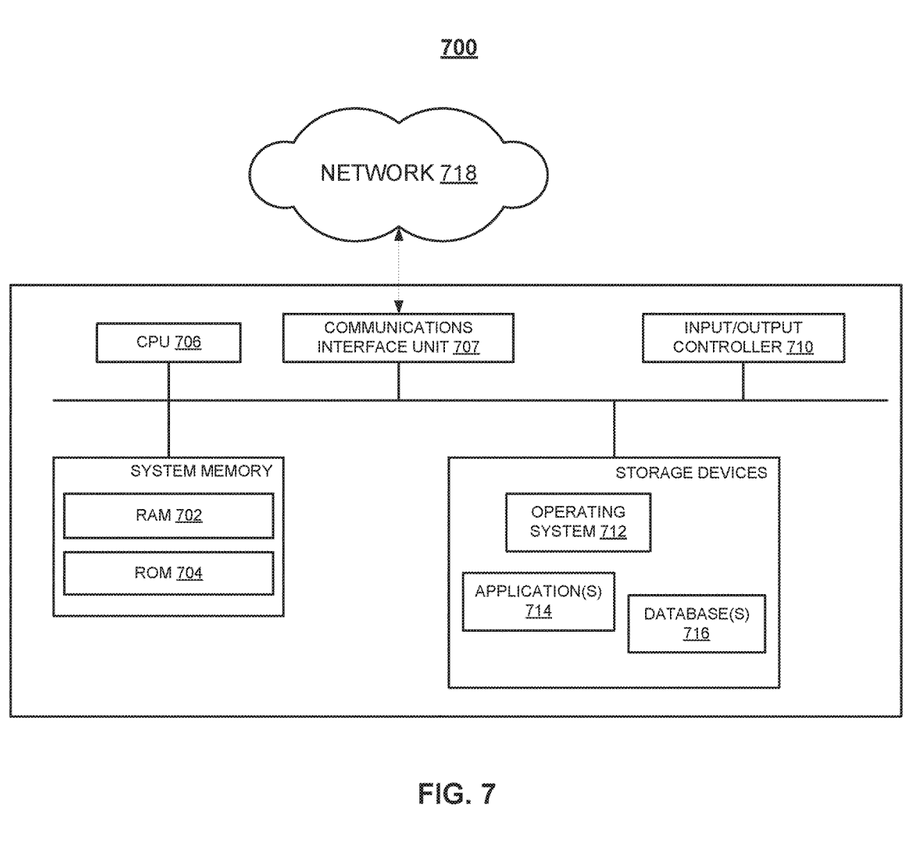
FIG. 7 is a block diagram of a computing device, such as any of the components of the systems of FIGS. 1-6, for performing any of the processes described herein, according to an illustrative embodiment.

FIG. 7 is a block diagram of a computing device, such as any of the components of the systems of FIGS. 1-6, for performing any of the processes described herein. Each of the components of these systems may be implemented on one or more computing devices 700. In certain aspects, a plurality of the components of these systems may be included within one computing device 700. In certain implementations, a component and a storage device may be implemented across several computing devices 700.

The computing device 700 includes at least one communications interface unit, an input/output controller 710, system memory, and one or more data storage devices. The system memory includes at least one random access memory (RAM 702) and at least one read-only memory (ROM 704). All of these elements are in communication with a central processing unit (CPU 706) to facilitate the operation of the computing device 700. The computing device 700 may be configured in many different ways. For example, the computing device 700 may be a conventional standalone computer or alternatively, the functions of computing device 700 may be distributed across multiple computer systems and architectures. Alternatively, a computer system may be virtualized to provide the functions of multiple computing devices 700. In FIG. 7, the computing device 700 is linked, via network or local network, to other servers or systems.

The computing device 700 may be configured in a distributed architecture, wherein databases and processors are housed in separate units or locations. Some units perform primary processing functions and contain at a minimum a general controller or a processor and a system memory. In distributed architecture implementations, each of these units may be attached via the communications interface unit 708 to a communications hub or port (not shown) that serves as a primary communication link with other servers, client or user computers and other related devices. The communications hub or port may have minimal processing capability itself, serving primarily as a communications router. A variety of communications protocols may be part of the system, including, but not limited to: Ethernet, SAP, SAS™, ATP, BLUETOOTH™, GSM and TCP/IP.

The CPU 706 includes a processor, such as one or more conventional microprocessors and one or more supplementary co-processors such as math co-processors for offloading workload from the CPU 706. The CPU 706 is in communication with the communications interface unit 708 and the input/output controller 710, through which the CPU 706 communicates with other devices such as other servers, user terminals, or devices. The communications interface unit 708 and the input/output controller 710 may include multiple communication channels for simultaneous communication with, for example, other processors, servers or client terminals.

The CPU 706 is also in communication with the data storage device. The data storage device may include an appropriate combination of magnetic, optical or semiconductor memory, and may include, for example, RAM 702, ROM 704, flash drive, an optical disc such as a compact disc or a hard disk or drive. The CPU 706 and the data storage device each may be, for example, located entirely within a single computer or other computing device; or connected to each other by a communication medium, such as a USB port, serial port cable, a coaxial cable, an Ethernet cable, a telephone line, a radio frequency transceiver or other similar wireless or wired medium or combination of the foregoing. For example, the CPU 706 may be connected to the data storage device via the communications interface unit 708. The CPU 706 may be configured to perform one or more particular processing functions.

The data storage device may store, for example, (i) an operating system 712 for the computing device 700; (ii) one or more applications 714 (e.g., computer program code or a computer program product) adapted to direct the CPU 706 in accordance with the systems and methods described here, and particularly in accordance with the processes described in detail with regard to the CPU 706; or (iii) database(s) 716 adapted to store information that may be utilized to store information required by the program.

The operating system 712 and applications 714 may be stored, for example, in a compressed, an uncompiled and an encrypted format, and may include computer program code. The instructions of the program may be read into a main memory of the processor from a computer-readable medium other than the data storage device, such as from the ROM 704 or from the RAM 702. While execution of sequences of instructions in the program causes the CPU 706 to perform the process steps described herein, hard-wired circuitry may be used in place of, or in combination with, software instructions for implementation of the processes of the present invention. Thus, the systems and methods described are not limited to any specific combination of hardware and software.

Suitable computer program code may be provided for performing one or more functions in relation to performing the processes as described herein. The program also may include program elements such as an operating system 712, a database management system and "device drivers" that allow the processor to interface with computer peripheral devices (e.g., a video display, a keyboard, a computer mouse, etc.) via the input/output controller 710.

The term "computer-readable medium" as used herein refers to any non-transitory medium that provides or participates in providing instructions to the processor of the computing device 700 (or any other processor of a device described herein) for execution. Such a medium may take many forms, including but not limited to, non-volatile media and volatile media. Nonvolatile media include, for example, optical, magnetic, or opto-magnetic disks, or integrated circuit memory, such as flash memory. Volatile media include dynamic random access memory (DRAM), which typically constitutes the main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM or EEPROM (electronically erasable programmable read-only memory), a FLASH-EEPROM, any other memory chip or cartridge, or any other non-transitory medium from which a computer can read.

Various forms of computer readable media may be involved in carrying one or more sequences of one or more instructions to the CPU 706 (or any other processor of a device described herein) for execution. For example, the instructions may initially be borne on a magnetic disk of a remote computer (not shown). The remote computer can load the instructions into its dynamic memory and send the instructions over an Ethernet connection, cable line, or even telephone line using a modem. A communications device local to a computing device 700 (e.g., a server) can receive the data on the respective communications line and place the data on a system bus for the processor. The system bus carries the data to main memory, from which the processor retrieves and executes the instructions. The instructions received by main memory may optionally be stored in memory either before or after execution by the processor. In addition, instructions may be received via a communication port as electrical, electromagnetic or optical signals, which are exemplary forms of wireless communications or data streams that carry various types of information.

It will be apparent that aspects of the systems and methods described herein may be implemented in many different forms of software, firmware, and hardware in the implementations illustrated in the drawings. The actual software code or specialized control hardware used to implement aspects consistent with the principles of the systems and method described herein is not limiting. Thus, the operation and behavior of the aspects of the systems and methods were described without reference to the specific software code—it being understood that one of ordinary skill in the art would be able to design software and control hardware to implement the aspects based on the description herein.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous.

Various aspects of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network can include, for example, any one or more of a personal area network (PAN), a local area network (LAN), a campus area network (CAN), a metropolitan area network (MAN), a wide area network (WAN), a broadband network (BBN), the Internet, and the like. Further, the communication networks can include, but are not limited to, for example, any one or more of the following network topologies, including a bus network, a star network, a ring network, a mesh network, a star-bus network, tree or hierarchical network, or the like. The communications modules can be, for example, modems or Ethernet cards.

As discussed above, computing system 700 can include clients and servers. A client and server are generally remote from each other and typically interact through a communication network. The relationship of client and server arises by virtue of computer programs running on the respective computers and having a client-server relationship to each other. Computer system 700 can be, for example, and without limitation, an enterprise server or group of servers, one or more desktop computers, one or more laptop computers, etc. Computer system 700 can also be embedded in another device, for example, and without limitation, a mobile telephone, a personal digital assistant (PDA), a mobile audio player, a Global Positioning System (GPS) receiver, a video game console, and/or a television set top box.

While this specification contains many specifics, these should not be construed as limitations on the scope of what may be claimed, but rather as descriptions of particular implementations of the subject matter. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

While operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The subject matter of this specification has been described in terms of particular aspects, but other aspects can be implemented and are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other variations are within the scope of the following claims.

What is claimed is:
1. A method for synchronizing comments to an electronic document across platforms, the method comprising:

receiving, by a processing device of a server, a request of a first user device to access an electronic document stored on a remote storage system in a native document format;
providing for presentation, via a remote document access user interface at the first user device, data of the electronic document;
receiving comment data comprising a plurality of comments of one or more user devices;
incorporating the comment data into the electronic document stored on the remote storage system in the native document format;
sending, by the processing device of the server, a message comprising the comment data to a second user device for incorporation into a local copy of the electronic document; and
providing, by the processing device of the server, the plurality of comments to the first user device for presentation with the data of the electronic document.

2. The method of claim 1, wherein the remote storage system comprises a cloud storage system.

3. The method of claim 1, wherein the second user device comprises a dedicated document processing application and wherein the native document format comprises a document format that is created by the dedicated document processing application.

4. The method of claim 1, wherein the remote document access user interface comprises any of a mobile application or a browser-based application.

5. The method of claim 1, further comprising:
receiving, by the server, an electronic document from the second user device; and
storing the electronic document in the native document format without converting the electronic document to a different format.

6. The method of claim 1, further comprising:
initiating a presentation of the plurality of comments with the electronic document at the second user device.

7. The method of claim 1, further comprising:
transmitting, by the server, the electronic document in the native document format to the second user device to store as the local copy of the electronic document; and
initiating, by the server, the incorporating of the comment data into the local copy of the electronic document at the second user device without downloading an additional copy of the electronic document.

8. The method of claim 1, further comprising:
periodically monitoring comments added to the electronic document, wherein each of the monitored comments is associated with a timestamp; and
periodically synchronizing the monitored comments based on the timestamp.

9. The method of claim 1 further comprising:
receiving a comment to the electronic document from a third user device;
determining that the comment and at least one of the plurality of comments are related to a same section of the electronic document; and
merging the comment and the at least one of the plurality of comments within a comment structure.

10. The method of claim 1, further comprising:
maintaining a log of the plurality of comments made to the electronic documents.

11. A system for synchronizing comments to an electronic document across platforms, the system comprising:
a remote storage system to store an electronic document in a native document format;
a processor communicatively coupled to the remote storage system, the processor being configured to:
receive a request of a first user device to access the electronic document;
provide for presentation, via a remote document access user interface at the first user device, data of the electronic document;
receive comment data comprising a plurality of comments of one or more user devices;
incorporate the comment data into the electronic document stored on the remote storage system in the native document format; and
send a message comprising the comment data to a second user device for incorporation into a local copy of the electronic document; and
provide the plurality of comments to the first user device for presentation with the data of the electronic document.

12. The system of claim 11, wherein the remote storage system comprises a cloud storage unit.

13. The system of claim 11, wherein the second user device comprises a dedicated document processing application and wherein the native document format comprises a document format that is created by the dedicated document processing application.

14. The system of claim 11, wherein the remote document access user interface comprises any of a mobile application or a browser-based application.

15. The system of claim 11, wherein the processor is further configured to:
receive an electronic document from the first user device; and
store the electronic document in the native document format without converting the electronic document to a different format.

16. The system of claim 11, wherein the processor is further configured to: initiate a presentation of the plurality of comments with the electronic document at the second user device.

17. The system of claim 11, wherein the processor is further configured to:
transmit the electronic document in the native document format to the second user device to store as the local copy of the electronic document; and
initiate the incorporation of the comment data into the local copy of the electronic document at the second user device without downloading an additional copy of the electronic document.

18. The system of claim 11, wherein the processor is further configured to:
periodically monitor comments added to the electronic document, wherein each of the monitored comments is associated with a timestamp; and
periodically synchronize the comments based on the timestamp.

19. The system of claim 11, wherein the processor is further configured to:
receive a comment to the electronic document from a third user device;
determine that the comment and at least one of the plurality of comments are related to a same section of the electronic document;
merge the comment and the at least one of the plurality of comments within a comment structure; and
maintain a log of comments made to the electronic documents.

20. A processor-readable non-transitory storage medium storing processor-executable instructions for synchronizing comments to an electronic document across platforms, the processor-executable instructions executable by a processor to:
- receive a request of a first user device to access an electronic document stored on a remote storage system in a native document format;
- provide for presentation, via a remote document access user interface at the first user device, data of the electronic document;
- receive comment data comprising a plurality of comments of one or more user devices;
- incorporate the comment data into the electronic document;
- send a message comprising the comment data to a second user device for incorporation into a local copy of the electronic document; and
- provide the plurality of comments to the first user device for presentation with the data of the electronic document.

* * * * *